(12) United States Patent
Zhang et al.

(10) Patent No.: US 8,136,225 B1
(45) Date of Patent: Mar. 20, 2012

(54) METHOD AND SYSTEM FOR PROVIDING A PERPENDICULAR MAGNETIC RECORDING HEAD

(75) Inventors: Jinqiu Zhang, Fremont, CA (US); Liubo Hong, San Jose, CA (US); Yong Shen, Saratoga, CA (US); Hongping Yuan, Fremont, CA (US); Tsung Yuan Chen, San Jose, CA (US); Honglin Zhu, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 979 days.

(21) Appl. No.: 12/121,624

(22) Filed: May 15, 2008

(51) Int. Cl.
*G11B 5/127* (2006.01)
(52) U.S. Cl. .................. 29/603.12; 360/125.1
(58) Field of Classification Search ............... 360/125.1, 360/125.09, 125.07, 125.11, 121, 125.2, 360/125.14, 125.08; 29/603.12, 603.13, 29/603.14, 603.08
See application file for complete search history.

(56) References Cited

U.S. PATENT DOCUMENTS

| | | | |
|---|---|---|---|
| 6,540,928 B1 | 4/2003 | Kobrin et al. | |
| 6,862,798 B2 | 3/2005 | Kruger et al. | |
| 6,877,213 B2 | 4/2005 | Zolla | |
| 6,949,833 B2 | 9/2005 | O'Kane et al. | |
| 7,023,658 B1 | 4/2006 | Knapp et al. | |
| 7,024,756 B2 | 4/2006 | Le et al. | |
| 7,108,796 B2 | 9/2006 | Bergevin et al. | |
| 7,120,988 B2 | 10/2006 | Le et al. | |
| 7,246,424 B2 | 7/2007 | Huang et al. | |
| 7,275,306 B2 | 10/2007 | Allen et al. | |
| 7,444,740 B1 * | 11/2008 | Chung et al. | 29/603.16 |
| 7,785,666 B1 * | 8/2010 | Sun et al. | 427/282 |
| 7,810,226 B2 * | 10/2010 | Hirabayashi et al. | 29/603.12 |
| 7,944,646 B2 * | 5/2011 | Mochizuki et al. | 360/125.1 |
| 8,015,692 B1 * | 9/2011 | Zhang et al. | 29/603.14 |
| 8,018,677 B1 * | 9/2011 | Chung et al. | 360/125.03 |
| 2003/0090834 A1 | 5/2003 | Kamarajugadda et al. | |
| 2005/0024779 A1 | 2/2005 | Le et al. | |
| 2005/0185332 A1 | 8/2005 | Hsiao et al. | |
| 2009/0279207 A1 * | 11/2009 | Sasaki et al. | 360/125.03 |
| 2010/0112486 A1 * | 5/2010 | Zhang et al. | 430/314 |

* cited by examiner

*Primary Examiner* — Allen Cao (57) ABSTRACT

A method and system for providing a PMR pole in a magnetic recording transducer including an intermediate layer are disclosed. The method and system include providing a mask including a line on the intermediate layer. The method further include providing a hard mask layer on the mask and removing the line. Thus, an aperture in the hard mask corresponding to the line is provided. The method and system also include forming a trench in the intermediate layer under the aperture. The trench has a bottom and a top wider than the bottom. The method further includes providing a PMR pole, at least a portion of which resides in the trench.

14 Claims, 8 Drawing Sheets

METHOD AND SYSTEM FOR PROVIDING A PERPENDICULAR MAGNETIC RECORDING HEAD

BACKGROUND

Figure 1:
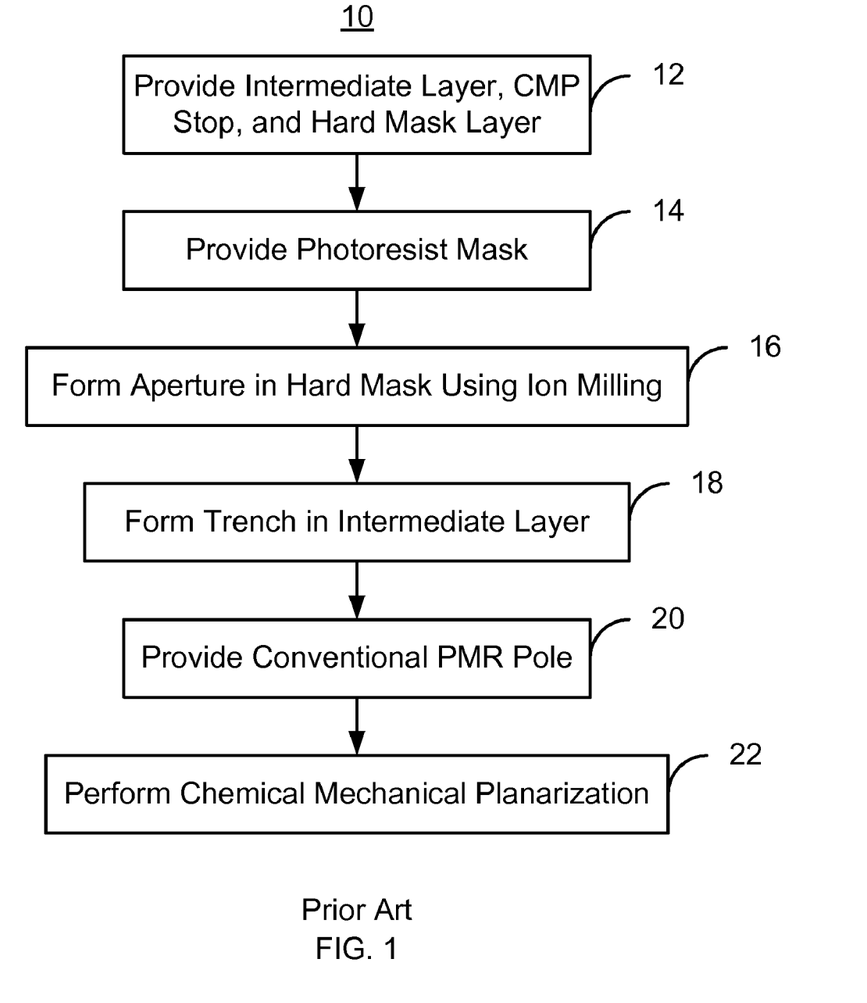
FIG. 1 is a flow chart depicting a conventional method for fabricating a PMR head.

FIG. 1 is a flow chart depicting a conventional method 10 for fabricating a conventional perpendicular magnetic recording (PMR) transducer. For simplicity, some steps are omitted. The conventional method 10 is used for providing a PMR pole. An intermediate layer, chemical mechanical planarization (CMP) stop layer and hard mask layer are provided, via step 12. The intermediate layer is typically aluminum oxide. The CMP stop layer may include Ru, while the hard mask layer may include NiCr. A photoresist mask is provided on the hard mask layer, via step 14. The photoresist mask includes an aperture above the portion of the intermediate layer in which the PMR pole is to be formed. A conventional aperture is formed in the hard mask layer, via step 16. Typically, this is accomplished through using a conventional ion mill. Step 16 also includes forming a conventional aperture in the CMP stop layer. Thus, through ion milling in step 16, the pattern of the photoresist mask is transferred to both the hard mask and the CMP stop layer in a conventional manner.

Using the hard mask and photoresist mask, a trench is formed in the aluminum oxide layer, via step 18. Step 18 is typically performed using an alumina reactive ion etch (RIE). The top of the trench 66 is desired to be wider than the trench bottom. In addition, the trench may extend through the aluminum oxide intermediate layer. As a result, the PMR pole formed therein will have its top surface wider than its bottom. Consequently, the sidewalls of the PMR pole will have a reverse angle. The conventional PMR pole materials are deposited, via step 20. A CMP is then performed, via step 22. The stop layer provided in step 12 is used to terminate the CMP. Thus, the conventional PMR pole is provided. Subsequent structures, such as a write gap and shields, may then be provided.

Although the conventional method 10 may provide the conventional PMR transducer, there may be drawbacks. Use of the photoresist mask and hard mask may result in relatively large variations in the critical dimension of the conventional PMR pole. The critical dimension corresponds to the track width of the conventional PMR pole. Such variations in track width may adversely affect fabrication and performance. In addition, the conventional PMR pole may be relatively large in size. Using conventional photolithography, the critical diameter of the apertures formed in step 16, and thus the trench provided in step 18, is typically greater than 150 nm. Consequently, without more, the conventional PMR poles formed using the conventional method 10 may not be usable in high density magnetic recording technology.

Accordingly, what is needed is an improved method for fabricating a PMR transducer.

SUMMARY

A method and system for providing a PMR pole in a magnetic recording transducer are disclosed. The magnetic recording transducer includes an intermediate layer. The method and system include providing a mask including a line on the intermediate layer. The method further include providing a hard mask layer on the mask and removing the line. Thus, an aperture in a hard mask corresponding to the line is provided. The method and system also include forming a trench in the intermediate layer under the aperture. The trench has a bottom and a top wider than the bottom. The method further includes providing a PMR pole, at least a portion of which resides in the trench.

DETAILED DESCRIPTION OF THE PREFERRED EMBODIMENTS

Figure 2:
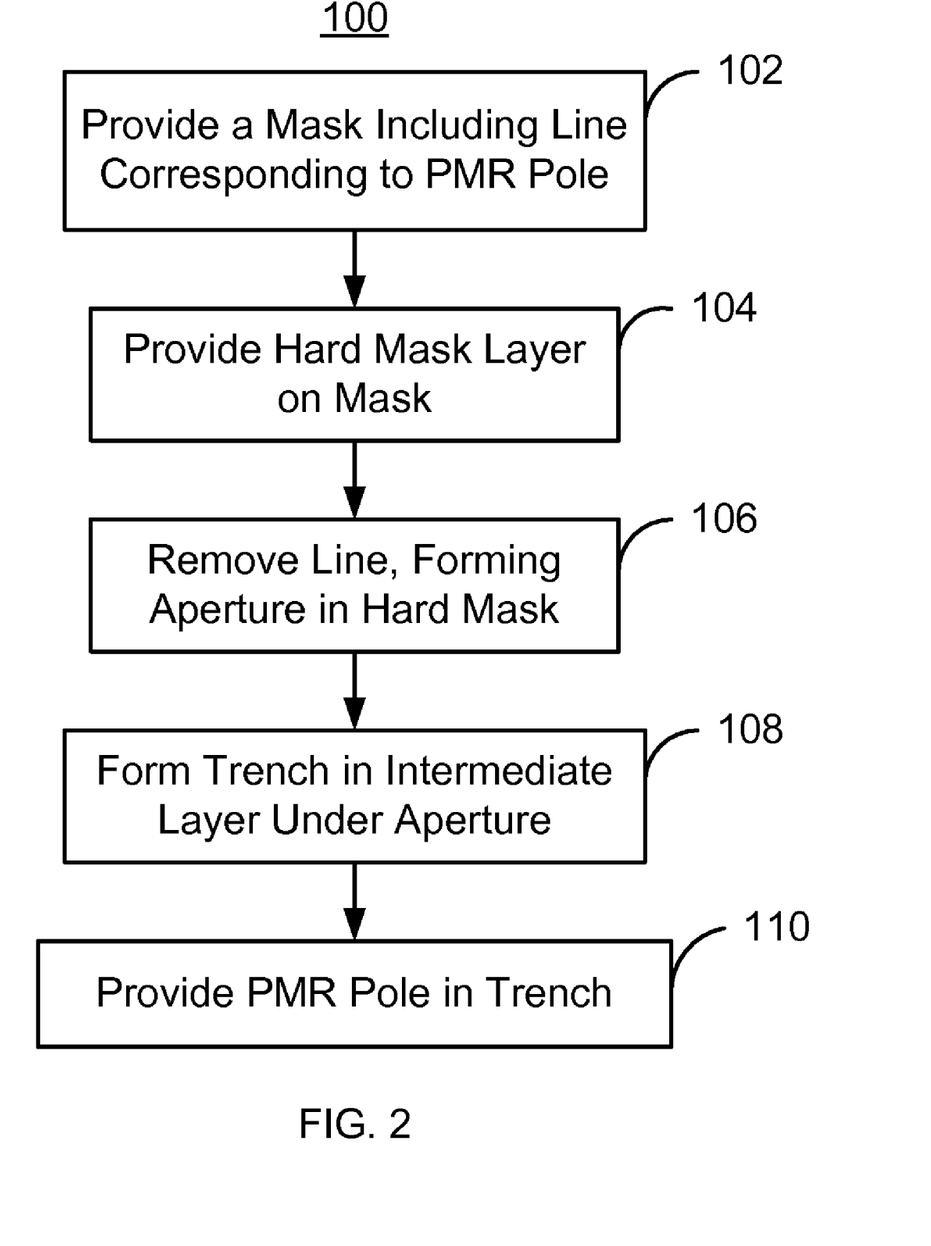
FIG. 2 is a flow chart depicting an exemplary embodiment of a method for fabricating a PMR transducer.

FIG. 2 is a flow chart depicting an exemplary embodiment of a method 100 for fabricating a PMR pole for a PMR transducer. For simplicity, some steps may be omitted. The PMR transducer being fabricated may be part of a merged head that also includes a read head (not shown) and resides on a slider (not shown). The method 100 also may commence after formation of other portions of the PMR transducer. The method 100 is also described in the context of providing a single PMR pole in a single magnetic recording transducer. However, the method 100 may be used to fabricate multiple transducers at substantially the same time. The method 100 and system are also described in the context of particular layers, such as a BARC layer. However, in some embodiments, such layers may include multiple sub-layers.

In one embodiment, the method 100 commences after formation of the intermediate layer(s) in which the PMR pole is to reside. In one embodiment, the intermediate layer is an insulator such as alumina. The intermediate layer may reside on an underlayer. Further, in one embodiment, the underlayer layer may be an etch stop layer. A mask is provided on the intermediate layer, via step 102. The mask includes a line that corresponds to the location of the PMR pole. In one embodiment, the mask is a photoresist mask and may be formed using photolithographic techniques. For example, a BARC might be used in order to improve formation of the line. The BARC reduces reflections in forming a photoresist mask on the BARC layer. In such an embodiment, formation of the mask may further include removal of any BARC exposed by the mask. A hard mask layer is provided on the mask, via step 104. For example, step 104 may include deposition of a material such as NiCr, Cr, and/or Ru.

The line in the mask is removed, via step 106. In one embodiment, step 106 may include removal of corresponding structures, such as any BARC residing beneath the line. In one embodiment, step 106 includes performing a planarization, such as a CMP, and a lift-off of any remaining photoresist. The hard mask is thus formed. In particular, removal of the line forms an aperture corresponding to the line. The aperture in the hard mask resides in substantially the position occupied by the line.

A trench is formed in the intermediate layer under the aperture, via step 108. The trench has a bottom and a top wider than the bottom. Consequently, the trench formed is appropriate for a PMR pole. In one embodiment, the trench extends through the intermediate layer. However, in another embodiment, the trench might extend only partially through the intermediate layer. In one embodiment, step 108 includes performing a RIE.

A PMR pole is provided, via step 110. At least a portion of the PMR pole resides in the trench. In one embodiment, only part of the PMR pole resides within the trench in the intermediate layer. Thus, the top of the PMR pole would be above the top of intermediate layer. In an alternate embodiment, the entire PMR pole resides within the trench. Formation of the PMR pole in step 110 may include providing a nonmagnetic layer in the trench. Such a nonmagnetic layer might be used to adjust the critical dimension, and thus the track width, of the PMR pole. Thus, the PMR pole would reside on such a nonmagnetic layer. In one embodiment, the nonmagnetic layer may be provided using atomic layer deposition (ALD). As part of step 110 a planarization stop layer might also be provided. In one embodiment, the planarization stop layer is provided on the nonmagnetic layer. The planarization stop layer may be a CMP stop layer. In one such embodiment, the planarization stop layer includes Ru. A seed layer for the PMR pole may also be provided on the planarization stop layer. In another embodiment, the planarization stop layer may also function as a seed layer. The layer(s) for the PMR pole may then be blanket deposited. A planarization, such as a CMP, may be performed. In addition, the geometry of the PMR pole might be further adjusted using an ion beam etch. Thus, the PMR pole may be formed. Although described above as part of formation of the PMR pole, at least some of the steps of providing the nonmagnetic layer, the planarization stop layer and/or the seed layer may be considered separate from providing the PMR pole.

Using the method 100, at least part of a PMR transducer may be formed. The method 100 utilizes the photoresist line to provide the aperture in the hard mask. In one embodiment, the line in the mask may have a critical dimension, or width, that is not larger than one hundred-fifty nanometers. The critical dimension of the line might also be not more than one hundred nanometers. As a result, the critical dimension for the PMR pole may be not more than one hundred-fifty nanometers in one embodiment. In another embodiment, the critical dimension might be not more than on hundred nanometers. The PMR transducer formed may thus be used at higher densities. For example, the PMR transducer formed might be usable in 400 Gb/in$^2$ or higher density transducers. Using the method 100, therefore, a PMR transducer usable at higher densities may be fabricated.

Figure 3:
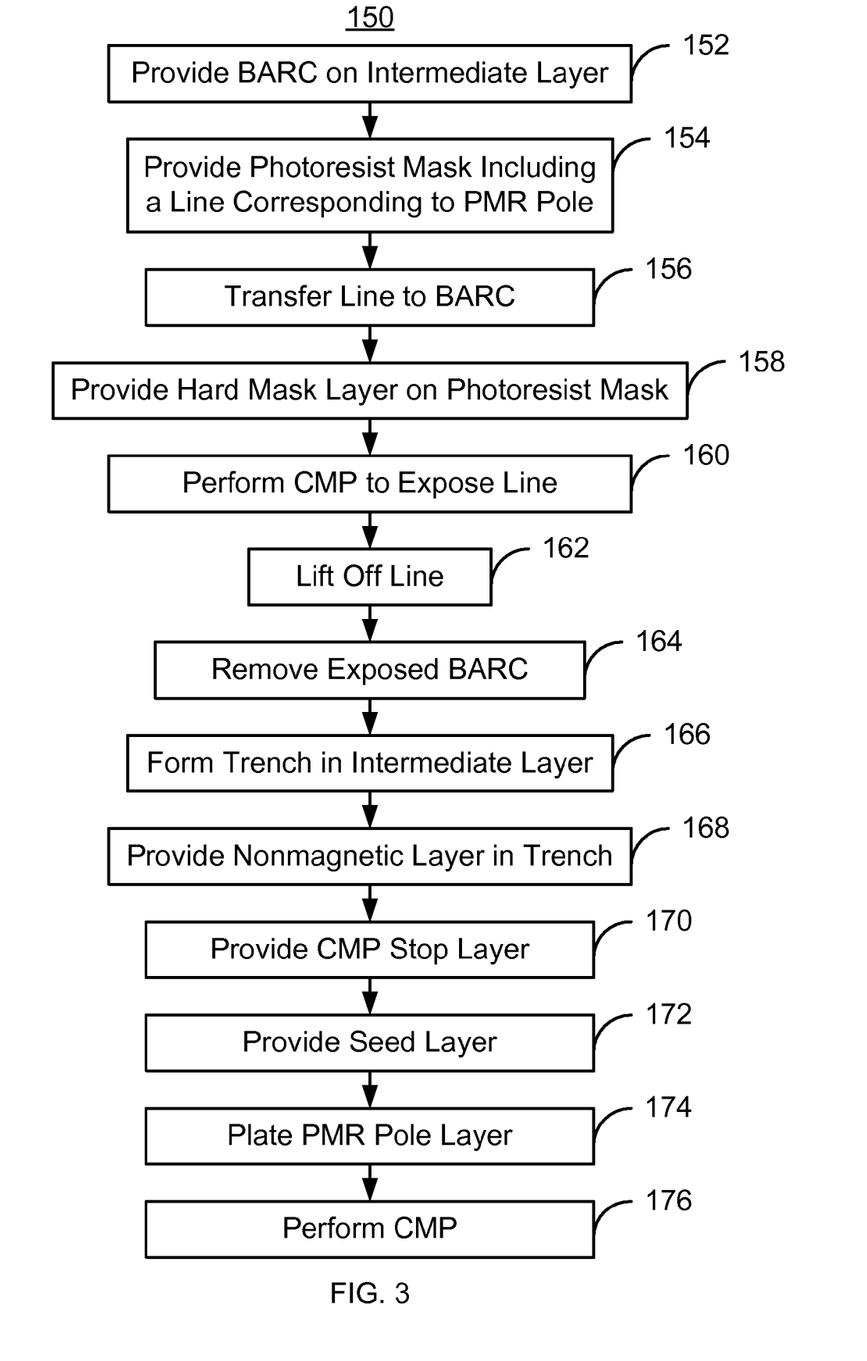
FIG. 3 is a flow chart depicting another embodiment of a method for fabricating a PMR transducer.

FIG. 3 is a flow chart depicting another exemplary embodiment of a method 150 for fabricating a PMR transducer. For simplicity, some steps may be omitted. FIGS. 4-13 are diagrams depicting an exemplary embodiment of a PMR transducer 200 as viewed from the ABS during fabrication. For clarity, FIGS. 4-13 are not to scale. Referring to FIGS. 3-13, the method 150 is described in the context of the PMR transducer 200. However, the method 150 may be used to form another device (not shown). The PMR transducer 200 being fabricated may be part of a merged head that also includes a read head (not shown) and resides on a slider (not shown). The method 150 also may commence after formation of other portions of the PMR transducer 200. The method 150 is also described in the context of providing a single PMR transducer. However, the method 150 may be used to fabricate multiple transducers at substantially the same time. The method 150 and device 200 are also described in the context of particular layers, such as a bottom antireflective coating (BARC) layer. However, in some embodiments, such layers may include multiple sublayers.

Figure 4:
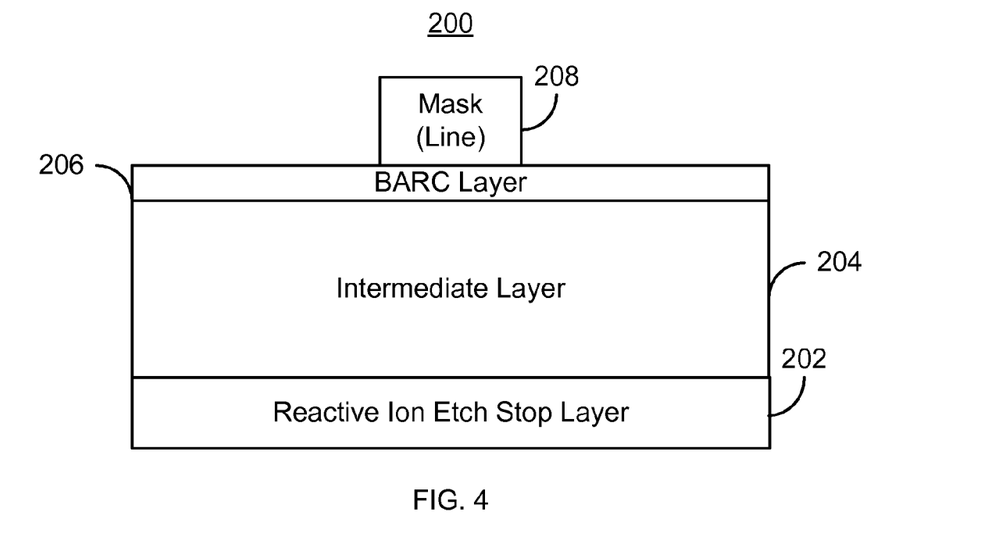
FIGS. 4-13 are diagrams depicting an exemplary embodiment of a perpendicular magnetic recording transducer during fabrication.

The method 150 commences after an intermediate layer is provided. The intermediate layer may be an alumina layer. A BARC is provided on the intermediate layer, via step 152. A photoresist mask is provided on the BARC, via step 154. The photoresist mask includes a line that corresponds to the location of the PMR pole. FIG. 4 depicts a portion of the PMR transducer 200 after step 154 is performed. In the embodiment shown, an underlayer 202 that may also functions as an etch stop layer 202, is shown. In addition, an intermediate layer 204 is also depicted. The PMR transducer 200 also includes a BARC 206 and a mask 208. In the embodiment shown, the mask 208 is shown as consisting of a line. However, in another embodiment, the mask 208 may include other features.

Figure 5:
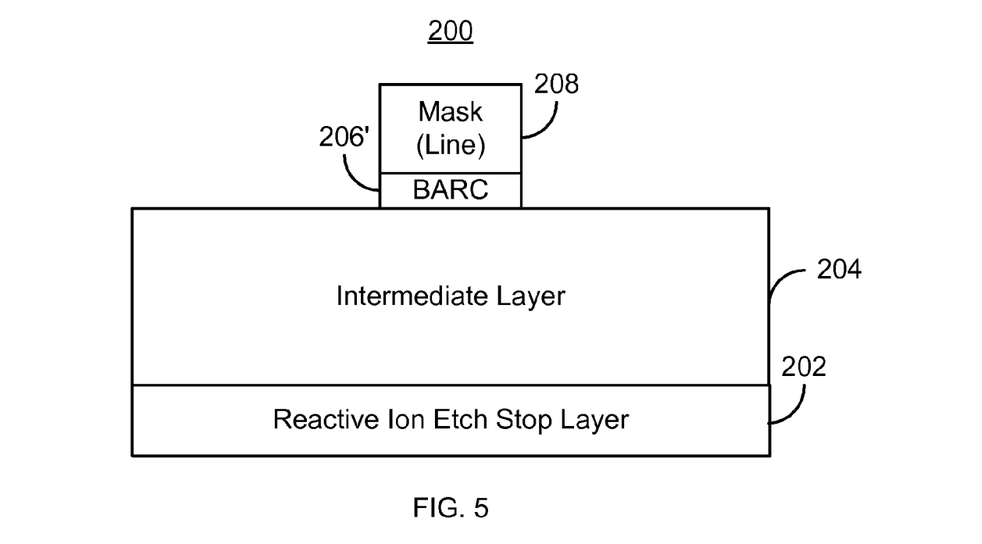
Figure 6:
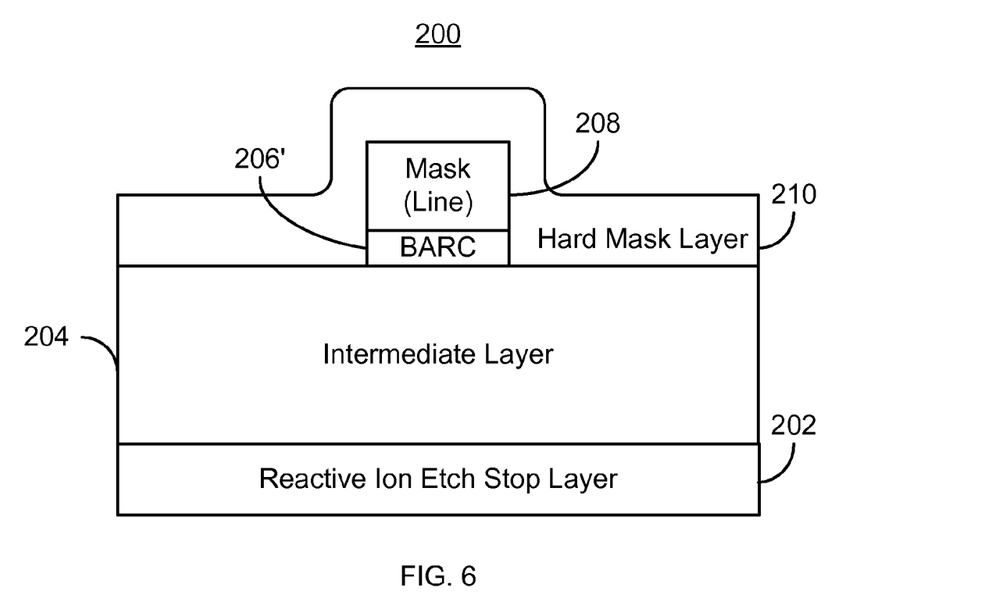

The pattern of the mask 208 is transferred to the BARC 206, via step 156. FIG. 5 depicts the PMR transducer 200 after step 156 is performed. Thus, the BARC 206' resides only under the line 208. A hard mask layer is provided on the PMR transducer 200, via step 158. Step 158 may include deposition of a material such as NiCr, Cr, and/or Ru. FIG. 6 depicts the PMR transducer 200 after step 158 is performed. Thus, a hard mask layer 210 has been provided.

Figure 7:
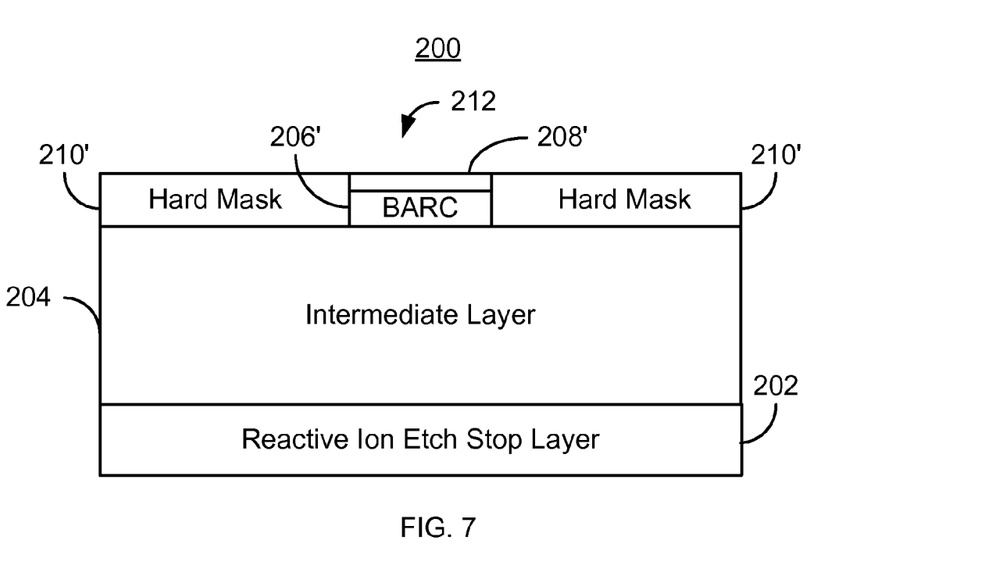

A planarization, such as a CMP, is performed to expose the line of the mask 208, via step 160. FIG. 7 depicts the PMR transducer after step 160 has been performed. Thus, a hard mask 210' has been formed from the hard mask layer 210. The hard mask 210' includes an aperture 212. In addition, a remaining portion 208' of the line of the mask is shown. Because of the CMP, the top surface of the PMR transducer 210 is substantially flat. Thus, the remaining portion 208' of the line and the hard mask 210' have top surfaces at substantially the same level. The aperture 212 corresponds to the line of the mask 208. As a result, the location and size of the aperture 212 match that of the line.

Figure 8:
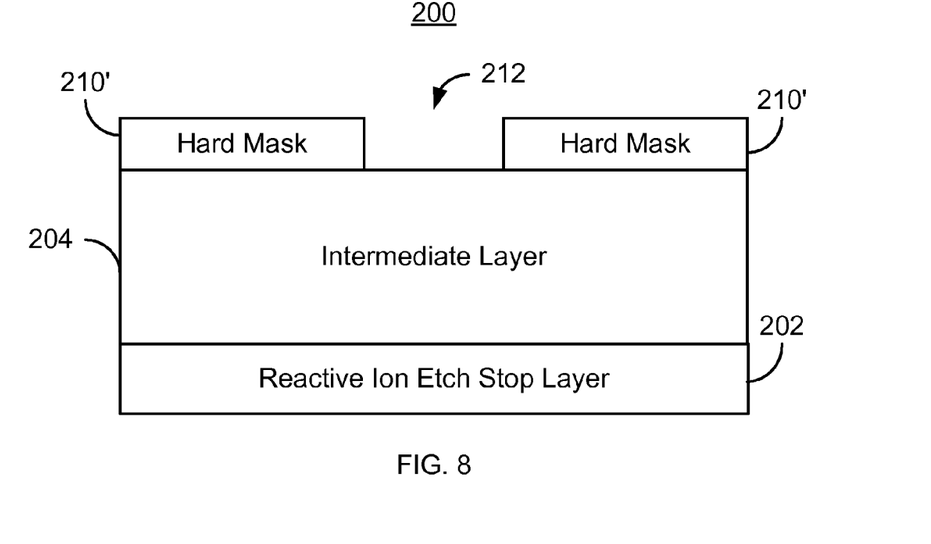

A lift-off is performed, via step 162. As a result, the remaining portion 208' of the line is removed. In addition, the remaining portion 206' of the BARC that was under the line is removed, via step 164. FIG. 8 depicts the PMR transducer 200 after step 164 is completed. Thus, the aperture 212 in the hard mask 210' exposes the underlying intermediate layer 204.

Figure 9:
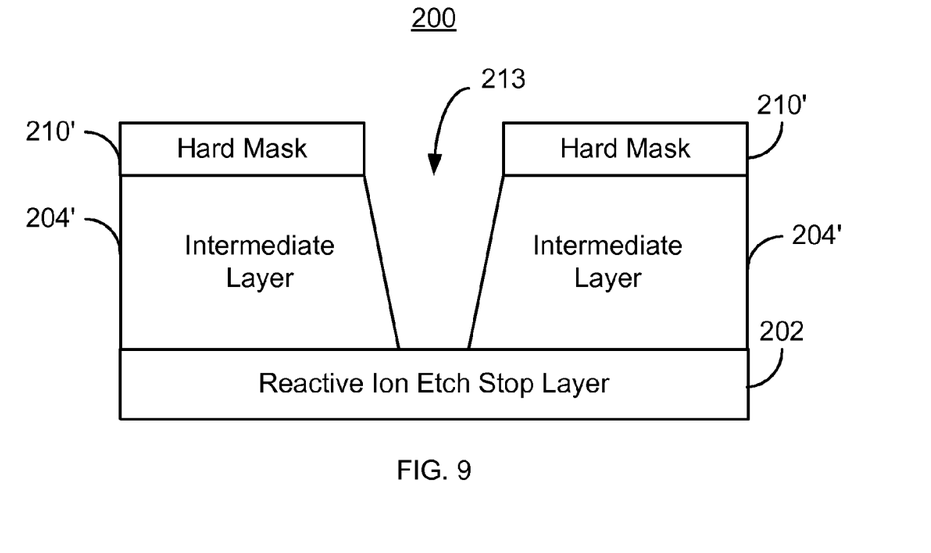

A RIE is performed to form a trench in the intermediate layer 204, via step 166. In one embodiment, the RIE is performed utilizing a Cl-containing gas. FIG. 9 depicts the PMR transducer after step 166 is performed. Thus, a trench 213 has been formed in the intermediate layer 204'. For clarity, the aperture 212 is no longer labeled. However, the trench 213 is formed under the aperture 212. The trench 213 has a bottom and a top wider than the bottom.

The PMR pole is then formed. This may occupy a number of steps. In one embodiment, a nonmagnetic layer is provided in the trench 213, via step 168. At least a portion of the nonmagnetic layer resides in the trench 213. In one embodiment, step 168 may be performed using ALD. However, in another embodiment, another method for providing the nonmagnetic layer may be used. Alternatively, step 168 might be omitted. Because it is magnetically separate from the pole being formed, the nonmagnetic layer may be used to reduce the critical diameter of the pole being formed. Stated differently, the nonmagnetic layer may be considered to make the trench 213 less wide and, in one embodiment, shallower. Thus, the thickness of the nonmagnetic layer may be used to tune the width of the PMR pole being formed. In particular, the width the PMR pole being formed may be reduced by twice the thickness of the nonmagnetic layer. For example, in one embodiment, the nonmagnetic layer may be at least fifty and not more than four hundred Angstroms. Consequently, use of a nonmagnetic layer in such an embodiment allows the width of the PMR pole being formed to be reduced by one hundred to eight hundred Angstroms.

Figure 10:
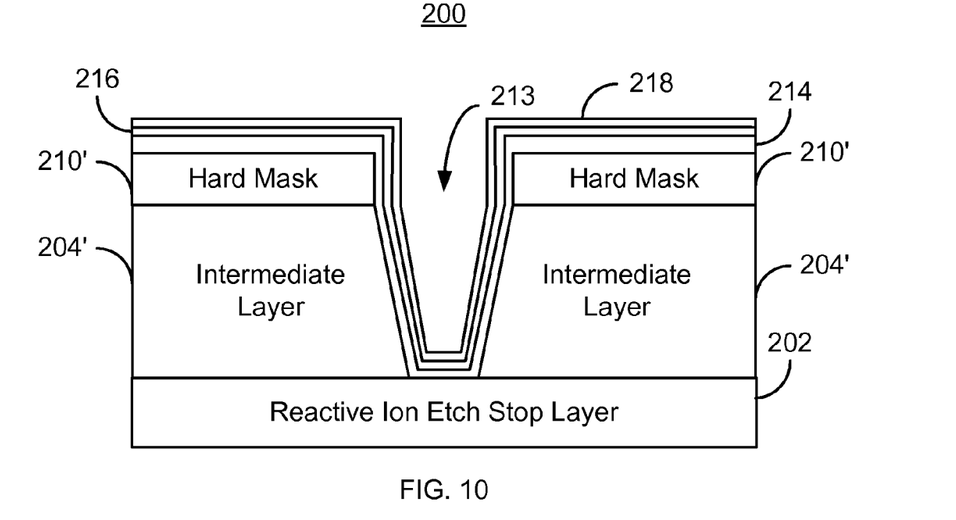

A planarization stop layer is provided on the nonmagnetic layer, via step 170. In one embodiment, the planarization stop layer is a CMP stop layer and may include materials such as Ru. A seed layer may also be provided on the CMP stop layer, via step 172. Such a seed layer may be nonmagnetic or magnetic. If magnetic, the seed layer may be magnetically indistinct from the PMR pole. Thus, the seed layer may be considered part of the PMR pole. In another embodiment, the seed layer may be nonmagnetic. In such an embodiment, the seed layer would be magnetically distinct from the PMR pole. In one embodiment, the seed layer and the planarization stop layer may function as a single layer or be merged into a single layer. FIG. 10 depicts the PMR transducer 200 after step 172 is performed. Thus, a nonmagnetic layer 214, a CMP stop layer 216, and a seed layer 218 are all shown. A portion of each of the nonmagnetic layer 214, the CMP stop layer 216, and the seed layer 218 resides in the trench 213. However, another portion of each of the nonmagnetic layer 214, the CMP stop layer 216, and the seed layer 218 also resides on and next to the hard mask 210'. Thus, a portion of the nonmagnetic layer 214 is above the top of the intermediate layer 204'.

A PMR pole layer(s) may be provided, via step 174. Step 174 may include plating the PMR pole layer(s). In one embodiment, a single layer is used. However, in another embodiment, multiple layers might be used for the PMR pole. Consequently, multiple layers might be deposited in step 174. In the embodiment described, the PMR pole layer(s) are blanket deposited. However, in another embodiment, masking might be used. In one embodiment, the PMR pole layer is plated on the planarization stop layer 216. In an embodiment in which a separate seed layer is used, the PMR pole layer may also be plated on the seed layer 218 and, if used, the nonmagnetic layer 214.

Figure 11:
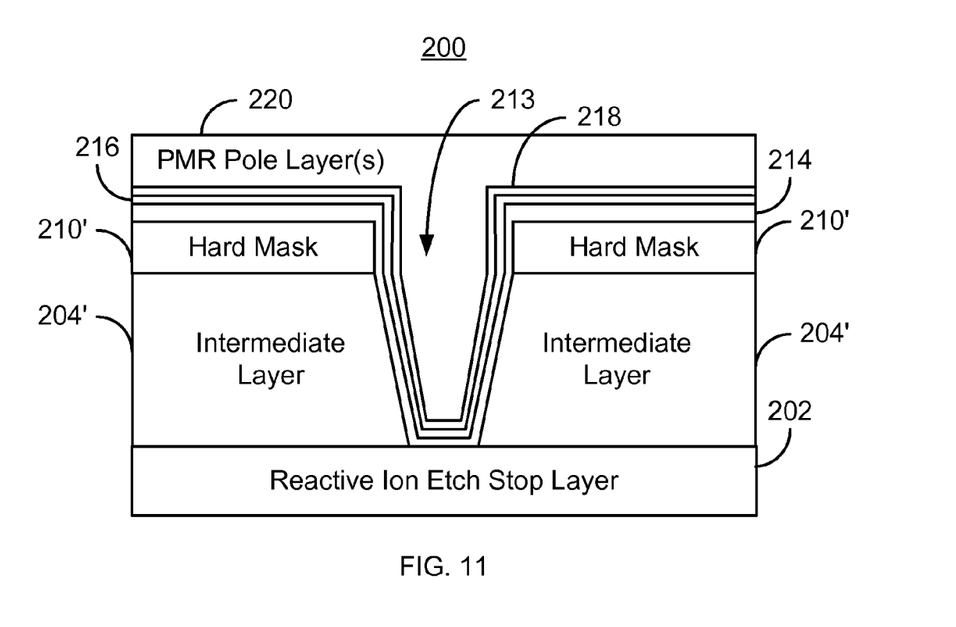

FIG. 11 depicts the PMR transducer 200 after step 174 is performed. Thus, the PMR pole layer 220 resides in the trench 213. However, another portion of the PMR pole layer 220 also resides on and next to the hard mask 210'. Thus, a portion of the PMR pole layer 220 is above the top of the intermediate layer 204'. A CMP, or other planarization selected, is performed, via step 176. The CMP planarization may terminate when at least a portion of the planarization stop layer 216 remains. In addition, an ion beam etch might also be performed in step 176 to further configure the geometry of the PMR pole.

Figure 12:
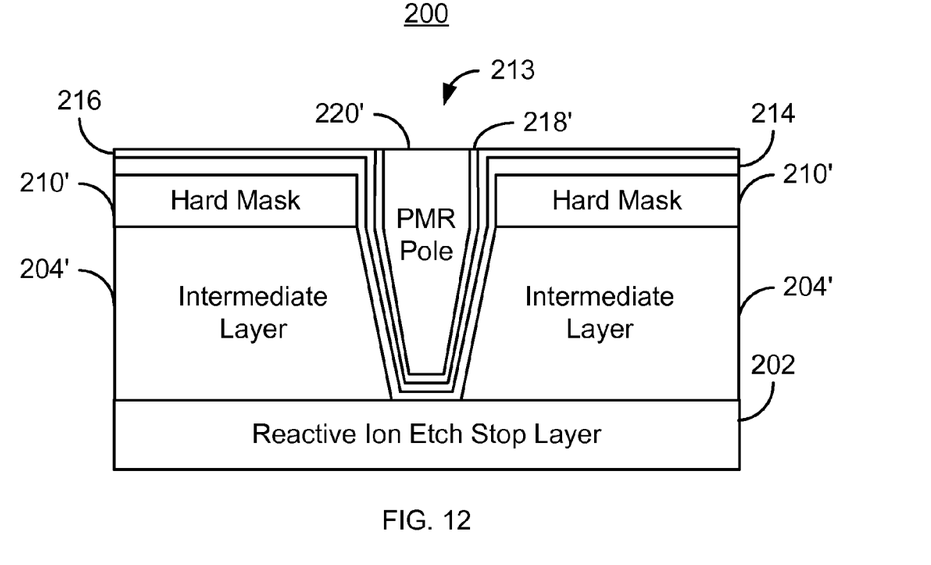

FIG. 12 depicts the PMR transducer 200 after step 176 has been performed. Consequently, the PMR pole 220' has been formed from the PMR pole layer(s) 220. In addition, a portion of the seed layer 218 and, in some embodiments, a portion of the CMP stop layer 216 have been removed. Consequently, only portions of the seed layer 214", portions of CMP stop layer 216', and nonmagnetic layer 214 remain after step 176 is performed. In the embodiment shown, only a portion of the PMR pole 220' resides within the trench 213. This portion of the PMR pole 220' has a top wider than the bottom. Stated differently, there is a negative angle (as measured from vertical) for these portions of the sidewalls of the PMR pole 220'. A remaining portion of the PMR pole 220' is next to the hard mask layer 210', nonmagnetic layer 220, and remaining planarization stop layer 222'. The sidewalls for this portion of the PMR pole 220' are s substantially vertical.

Figure 13:
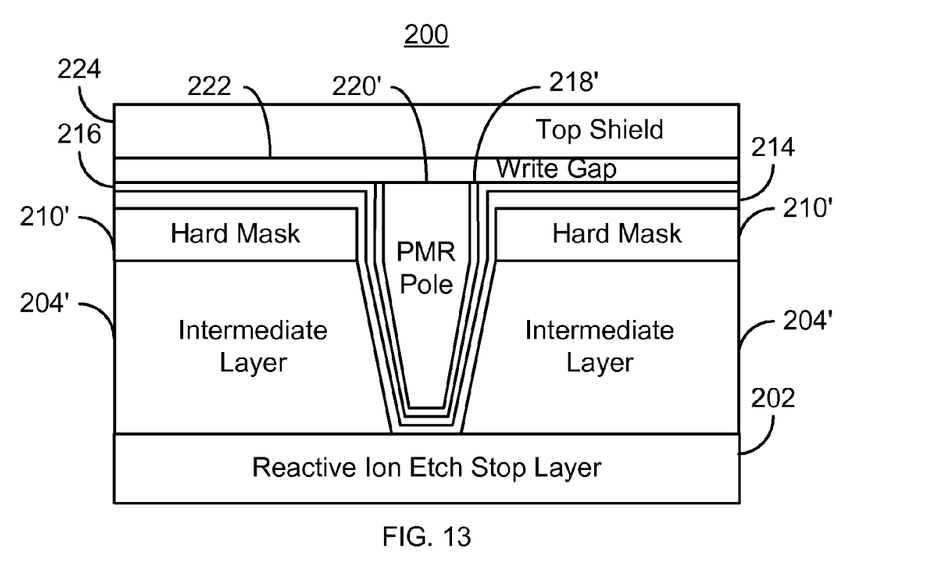

Fabrication of the PMR transducer 200 might then be completed. For example, a write gap, a shield, and other structures might be provided. FIG. 13 depicts the PMR transducer 200 after such structure are provided. Thus, the write gap 222 and top shield 224 are shown. In one embodiment, the write gap 228 may be an insulator, such as aluminum oxide. In another embodiment, other material(s) may be used.

Using the method 150, at least part of the PMR transducer 200 may be formed. The method 150 utilizes the photoresist line of the mask 208 to provide the aperture 212 in the hard mask 210'. In one embodiment, the line in the mask 208' may have a critical dimension, or width, that is not larger than one hundred-fifty nanometers. The critical dimension of the line 208 might also be not more than one hundred nanometers. As a result, the critical dimension for the PMR pole 220' may be not more than one hundred-fifty nanometers in one embodiment. In another embodiment, the critical dimension might be not more than one hundred nanometers. The PMR transducer 200 may thus be used at higher densities. For example, the PMR transducer 200 might be usable in 400 Gb/in$^2$ or higher density transducers. Using the method 150, therefore, a PMR transducer 200 usable at higher densities may be fabricated.

We claim:

1. A method for providing a PMR pole in a magnetic recording transducer including an intermediate layer, the method comprising:
   providing a mask on the intermediate layer, the mask including a line;
   providing a hard mask layer on the mask;
   removing the line, thereby providing an aperture in the hard mask corresponding to the line;
   forming a trench in the intermediate layer under the aperture, the trench having a bottom and a top wider than the bottom; and
   providing a PMR pole, at least a portion of the PMR pole residing in the trench.

2. The method of claim 1 wherein the line includes a photoresist line.

3. The method of claim 1 wherein the step of forming the trench further includes:
   performing at least one reactive ion etch to remove a portion of the intermediate layer.

4. The method of claim 1 further comprising:
   providing a nonmagnetic layer in the trench, at least a portion of the nonmagnetic layer residing in the trench, the PMR pole residing on the nonmagnetic layer.

5. The method of claim 1 wherein the step of providing the PMR pole further includes:
   providing a planarization stop layer;
   plating a PMR pole layer on the planarization stop layer; and
   performing a planarization.

6. The method of claim 1 wherein the step of providing the PMR pole further includes:
   providing a seed layer for the PMR pole layer on the planarization stop layer.

7. The method of claim 1 further comprising:
   providing a bottom antireflective coating (BARC) under the mask; and
   transferring the line to the BARC before the step of providing the hard mask layer, a remaining portion of the BARC residing under the line.

8. The method of claim 7 further comprising:
   removing the remaining portion of the BARC under the line after the line has been removed.

9. The method of claim 1 wherein the step of removing the line further includes:
   performing a planarization of the hard mask.

10. The method of claim 1 wherein the top of the PMR pole has a width not more than one hundred fifty nanometers.

11. The method of claim 10 wherein the width is not more than one hundred nanometers.

12. A method for providing a magnetic recording transducer including an intermediate layer, the method comprising:
   providing a bottom antireflective coating (BARC) on the intermediate layer;
   providing a mask on the BARC, the mask including a line;
   transferring the line to the BARC, a remaining portion of the BARC residing under the line;
   providing a hard mask layer on the mask;
   performing a first chemical mechanical planarization (CMP) to expose the line, thereby providing an aperture in the hard mask corresponding to the line;
   performing a lift-off to remove the line;
   removing the remaining portion of the BARC under the line after the line has been removed;
   performing a reactive ion etch to form a trench in the intermediate layer under the aperture, the trench having a bottom and a top wider than the bottom; and
   providing the PMR pole, at least a portion of the PMR pole residing in the trench.

13. The method of claim 12 further comprising:
   providing a nonmagnetic layer in the trench, at least a portion of the nonmagnetic layer residing in the trench; and
   providing a CMP stop layer on the nonmagnetic layer.

14. The method of claim 12 wherein the step of providing the PMR pole further includes:
   providing a seed layer on the CMP stop layer;
   plating a PMR pole layer on the planarization stop layer; and
   performing a planarization.

* * * * *